US008210487B2

(12) United States Patent
Fan et al.

(10) Patent No.: US 8,210,487 B2

(45) Date of Patent: Jul. 3, 2012

(54) AUTOMATIC MOUNTING APPARATUS

(75) Inventors: Yong-Miao Fan, Shenzhen (CN); Hong-Jun Feng, Shenzhen (CN); Peng Zhang, Shenzhen (CN); Yu-Bin Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 423 days.

(21) Appl. No.: 12/542,708

(22) Filed: Aug. 18, 2009

(65) Prior Publication Data

US 2011/0001029 A1 Jan. 6, 2011

(30) Foreign Application Priority Data

Jul. 2, 2009 (CN) .......................... 2009 1 0303949

(51) Int. Cl.
*B23Q 7/10* (2006.01)

(52) U.S. Cl. ......... 248/316.1; 269/56; 269/291; 269/32; 29/700; 29/811.2; 29/525.01; 29/281.1

(58) Field of Classification Search ............... 248/316.1; 29/525.01, 700, 809, 811.2, 225; 269/56, 269/291, 32

See application file for complete search history.

(56) References Cited

U.S. PATENT DOCUMENTS 4,532,706 A * 8/1985 Horn ............................... 29/809
4,550,485 A * 11/1985 Killian ............................ 29/450
4,592,122 A * 6/1986 Sikula ............................. 29/229
4,738,013 A * 4/1988 Yamashita et al. .............. 29/890
5,077,877 A * 1/1992 Piotrowski ...................... 29/229
5,146,676 A * 9/1992 Cuba ............................... 29/229
5,432,996 A * 7/1995 Imgrut et al. ................... 29/754
5,588,204 A * 12/1996 Rossman ......................... 29/809
5,875,536 A * 3/1999 Ring ............................ 29/407.1
6,212,746 B1 * 4/2001 Cooks, Jr. .................. 29/243.56
6,789,313 B2 * 9/2004 Hendricks .................. 29/888.04
7,089,640 B2 * 8/2006 Tanaka et al. ................... 29/229
7,210,219 B2 * 5/2007 Thal ............................... 29/709
7,401,400 B2 * 7/2008 Kim ................................ 29/709
7,694,400 B2 * 4/2010 Schlueter et al. ............... 29/258
8,001,674 B2 * 8/2011 Chen et al. ....................... 29/709
8,015,680 B2 * 9/2011 Feng et al. .................... 29/33 K
2011/0146455 A1 * 6/2011 Simon et al. ...................... 81/44

* cited by examiner

*Primary Examiner* — Terrell McKinnon
*Assistant Examiner* — Daniel J Breslin
(74) *Attorney, Agent, or Firm* — Altis Law Group, Inc.

(57) ABSTRACT

An apparatus includes a bracket, a pushing member having a pushing surface, a magazine member to fitting about a plurality of clamping rings, a sending member, a fixing member fixed to the bracket and a resisting member fixed to the fixing member. The fixing member defines a positioning hole for fixing the magazine member, with the clamping rings freely sliding through the positioning hole. The sending member includes two guiding rods fixed to the fixing member, two elastic elements fitting about the corresponding guiding rods, and a moving board slidably mounted to the guiding rods. The elasticity of the elastic elements urges the moving board to drive one of the plurality of clamping rings to resist against the resisting member. When the pushing member is moved towards the fixing member, the pushing surface pushes the one clamping ring to clamp a shaft of a connecting piece.

16 Claims, 6 Drawing Sheets

AUTOMATIC MOUNTING APPARATUS

BACKGROUND

1. Technical Field

The disclosure relates to automatic mounting apparatuses, and especially to a mounting apparatus mounting a clamping ring to a connecting piece automatically.

2. Description of Related Art

Nowadays, in assembly of a collapsible device, such as a notebook computer or a clamshell mobile phone, a connecting piece is generally needed to connect two components of the collapsible device, with a shaft of the connecting piece being clamped with a snap ring for preventing the components from disengaging from the connecting piece.

Normally, the snap ring is manually mounted to the shaft of the connecting piece. However, it is quite inconvenient and inefficient to manually mount the snap ring to the connecting piece, and in this process, the operators can easily become tired. Moreover, in manual operation, the snap ring is too small to be easily handled, and may even stick to hands, which is inconvenient for the operators.

DETAILED DESCRIPTION

Figure 1:
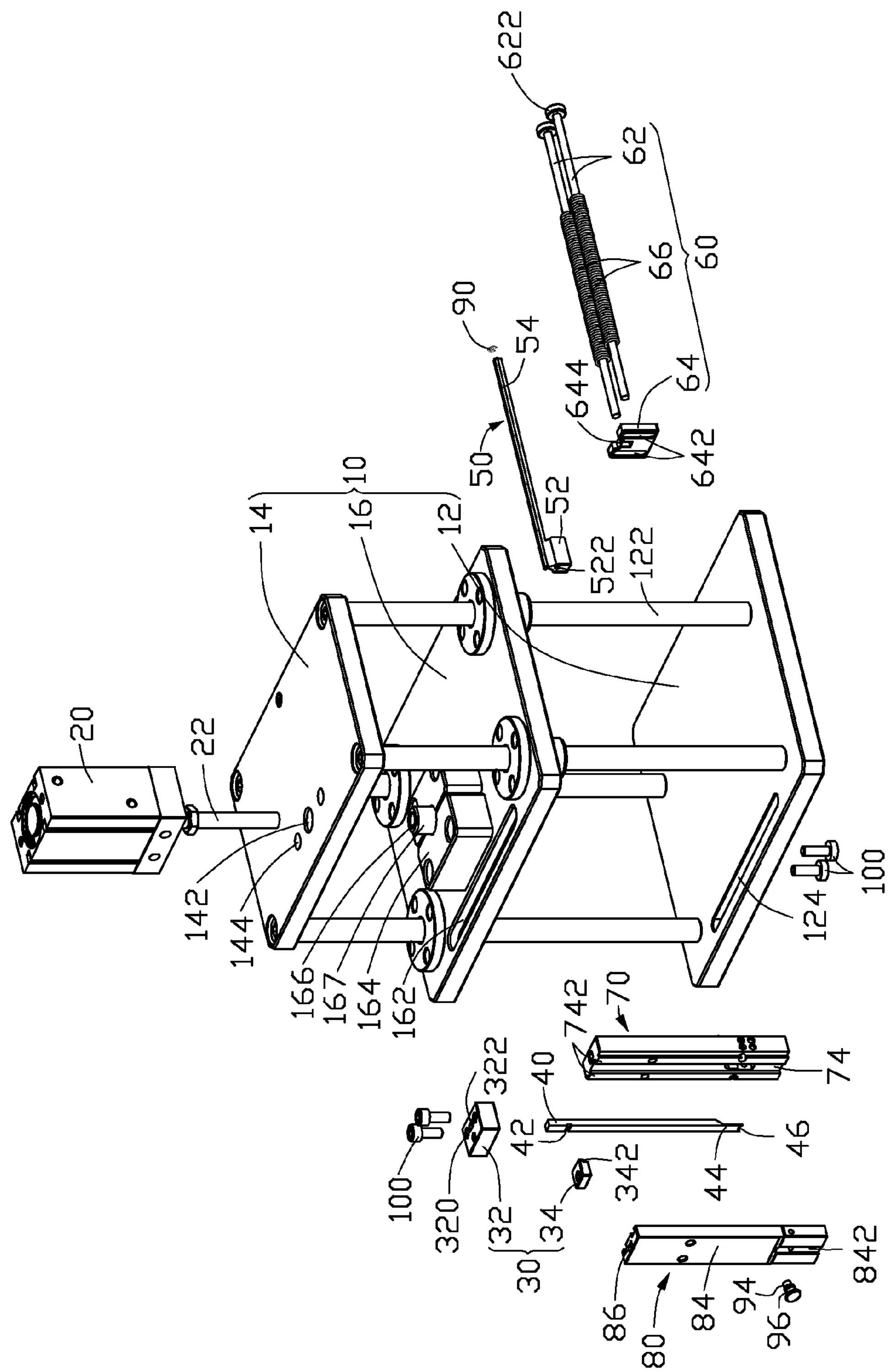
FIG. 1 is an exploded, isometric view of an exemplary embodiment of an automatic mounting apparatus, a connecting piece, and a clamping ring, the automatic mounting apparatus including a magazine member and a sending member.
Figure 2:
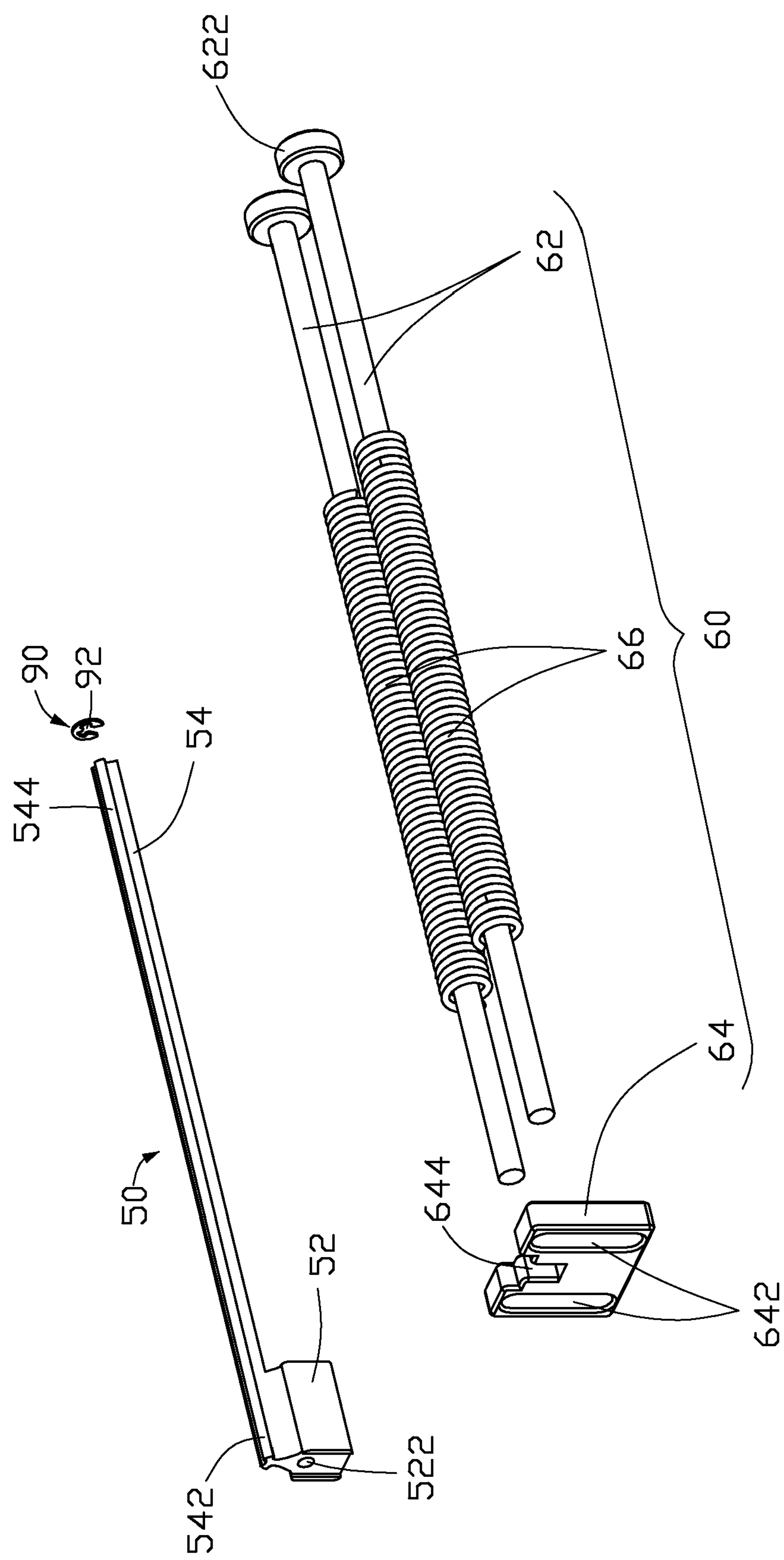
FIG. 2 is an enlarged, isometric view of the clamping ring, the magazine member, and the sending member of FIG. 1.
Figure 3:
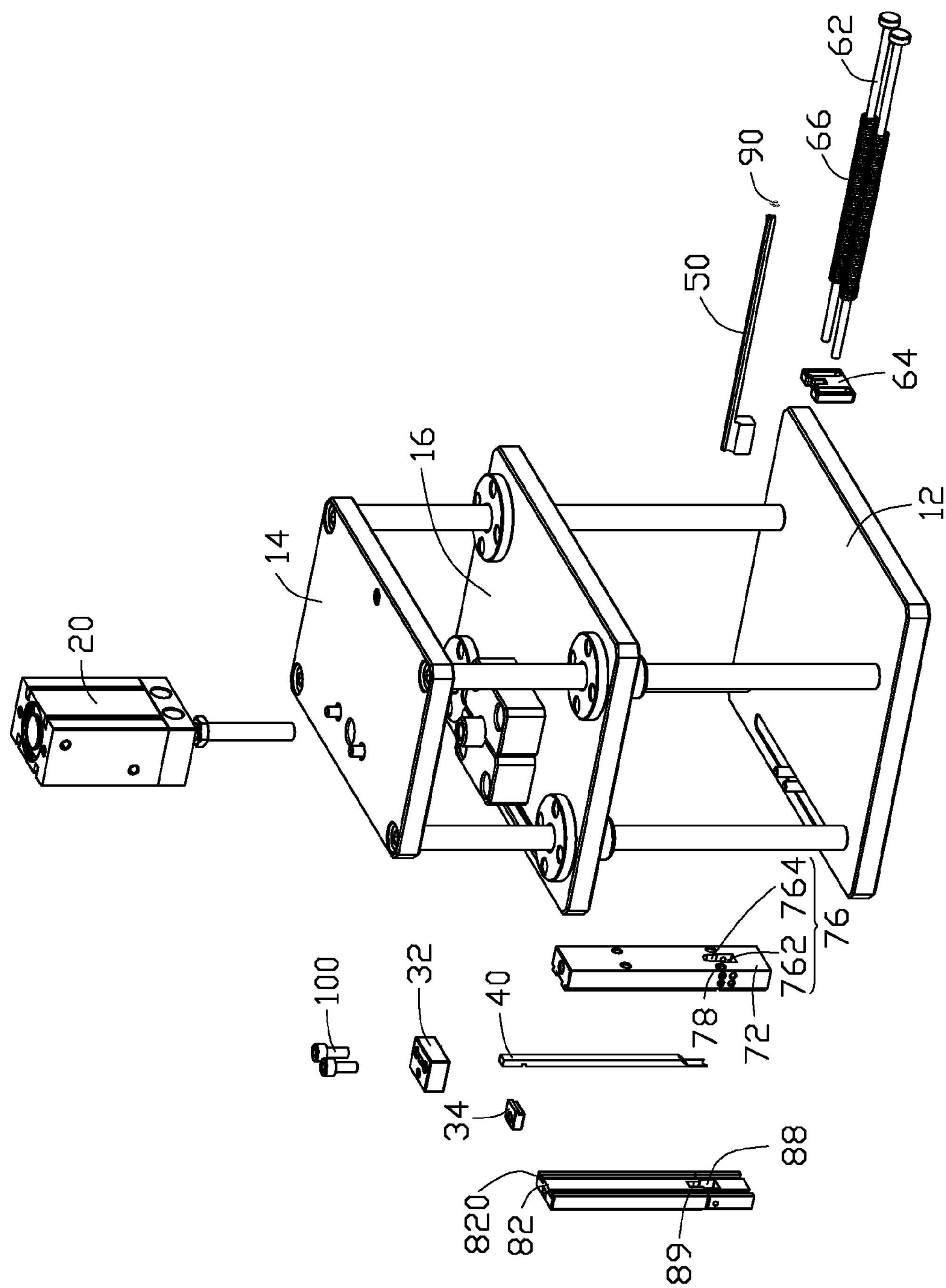
FIG. 3 similar to FIG. 1, but viewed from another perspective.

Referring to FIGS. 1 to 3, an exemplary embodiment of an automatic mounting apparatus is used to drive a clamping ring 90 to clamp a shaft 94 of a connecting piece 96 mounted to an object (not shown), such as chassis of a notebook computer. The automatic mounting apparatus includes a bracket 10, an air cylinder 20, a connecting member 30, a pushing member 40, a magazine member 50, a sending member 60, a fixing member 70, a resisting member 80, and a plurality of fasteners 100, such as screws.

The bracket 10 includes a bottom board 12, a top board 14 parallel to the bottom board 12, and a sliding board 16 parallel to the bottom and top boards 12 and 14, the sliding board 16 being located between the bottom and top boards 12 and 14. Four fixing rods 122 parallel to one another, perpendicularly extend up from the bottom board 12, through the sliding board 16, to connect to the top board 14. The sliding board 16 is slidable up and down relative to the fixing rods 122. The top board 14 defines two fixing holes 144 and a through hole 142 between the two fixing holes 144. The bottom board 12 defines a stepped groove 124 neighboring and parallel to a side of the bottom board 12. A fixing slot 162 parallel to and aligned with the stepped groove 124 is defined in the sliding board 16. A protrusion 164 neighboring the fixing slot 162 protrudes up from the sliding board 16 towards the top board 14. A fixing post 167 defining a fixing hole 166 extends up from a top of the protrusion 164.

The air cylinder 20 includes a retractable guide shaft 22, a distal end of the guiding shaft 22 is fixed in the fixing hole 166 of the bracket 10.

The connecting member 30 includes a fixing block 32 and a clamping block 34 fixed to a bottom of the fixing block 32. The fixing block 32 defines two screw holes 320, and a fixing hole 322 between the screw holes 320. A clamping tenon 342 extends from an upper portion of one end of the clamping block 34.

A pushing portion 44 extends from a first end of the pushing member 40, and a thickness of the pushing portion 44 is smaller than a thickness of the pushing member 40. A distal end of the pushing portion 44 forms an arc-shaped pushing surface 46, corresponding to a circumference of the clamping ring 90. A thickness of the pushing surface 46 is little smaller than a thickness of the clamping ring 90. The pushing member 40 defines a clamping slot 42, adjacent to a second end opposite to the first end of the pushing portion 44, for clamping the clamping tenon 342 of the connecting member 30.

The magazine member 50 includes a fixing portion 52 defining a receiving hole 522 in an end surface of the fixing portion 52, and a magazine portion 54 located on the fixing portion 52 and parallel to the receiving hole 522. The magazine portion 54 includes a first end 542 located on the fixing portion 52 and having an end surface coplanar with the end surface of the fixing portion 52, and a second end 544 opposite to the first end 542 and away from the fixing portion 52. The magazine portion 54 has a Y-shaped cross-section, corresponding to cutouts 92 defined in a plurality of clamping rings 90. Each of the clamping rings 90 slidably fits about the magazine portion 54 from the second end 544 via the cutout 92 of in each clamping ring 90. In other embodiments, the cross-section of the magazine portion 54 may have another shape, as long as it corresponds to the cutout of the clamping ring 90.

The sending member 60 includes two guiding rods 62, two elastic elements 66 fitting about the guiding rods 62 respectively, and a moving board 64 mounted to the two guiding rods 62. In this embodiment, the elastic elements 66 are two helical springs. A first end of each guiding rod 62 forms a head portion 622 having a greater diameter than a diameter of the guiding rod 62, for preventing the corresponding elastic element 66 and the moving board 64 from disengaging from the guiding rod 62. The moving board 64 defines two parallel long through holes 642, allowing second ends opposite to the first ends of the guiding rods 62 to pass therethrough, correspondingly. A Y-shaped cutout 644 is defined in the moving board 64 between the through holes 642, for slidably clamping the magazine portion 54 of the magazine member 50.

The fixing member 70 includes a first side surface 72 and a second side surface 74 opposite to the first side surface 72. A positioning hole 76 and two fixing holes 78 respectively located at opposite sides of the positioning hole 76 are defined in a lower part of the fixing member 70, passed through the first and second side surfaces 72 and 74. The positioning hole 76 includes a fixing port 762 for fixing the fixing portion 52 of the magazine member 50, and a through port 764 communicating with the fixing port 762 for the magazine portion 54 of the magazine member 50 passing therethrough. Two parallel fins 742 longitudinally protrude from opposite sides of the second side surface 74.

The resisting member 80 includes a first surface 82 and a second surface 84 opposite to the first surface 82. The resisting member 80 defines a sliding groove 86, longitudinally passing through the resisting member 80 and parallel to the first surface 82, for the pushing member 40 passing therethrough. The first surface 82 longitudinally defines two clamping slots 820 in opposite sides of the first surface 82, for engagably receiving the fins 742 of the fixing member 70, correspondingly. The resisting member 80 defines a fixing hole 88 passed through the first and second surfaces 82, 84, and located between the two clamping slots 820. A receiving space 89 is formed in the first surface 82 and extends to communicate with the sliding groove 86. Therefore, an inner side facing the receiving space 89 of the sliding groove 86 forms a resisting side 83 (shown in FIG. 6). A groove 842 is defined in a lower part of the second surface 84, communicating with the sliding groove 86.

Figure 4:
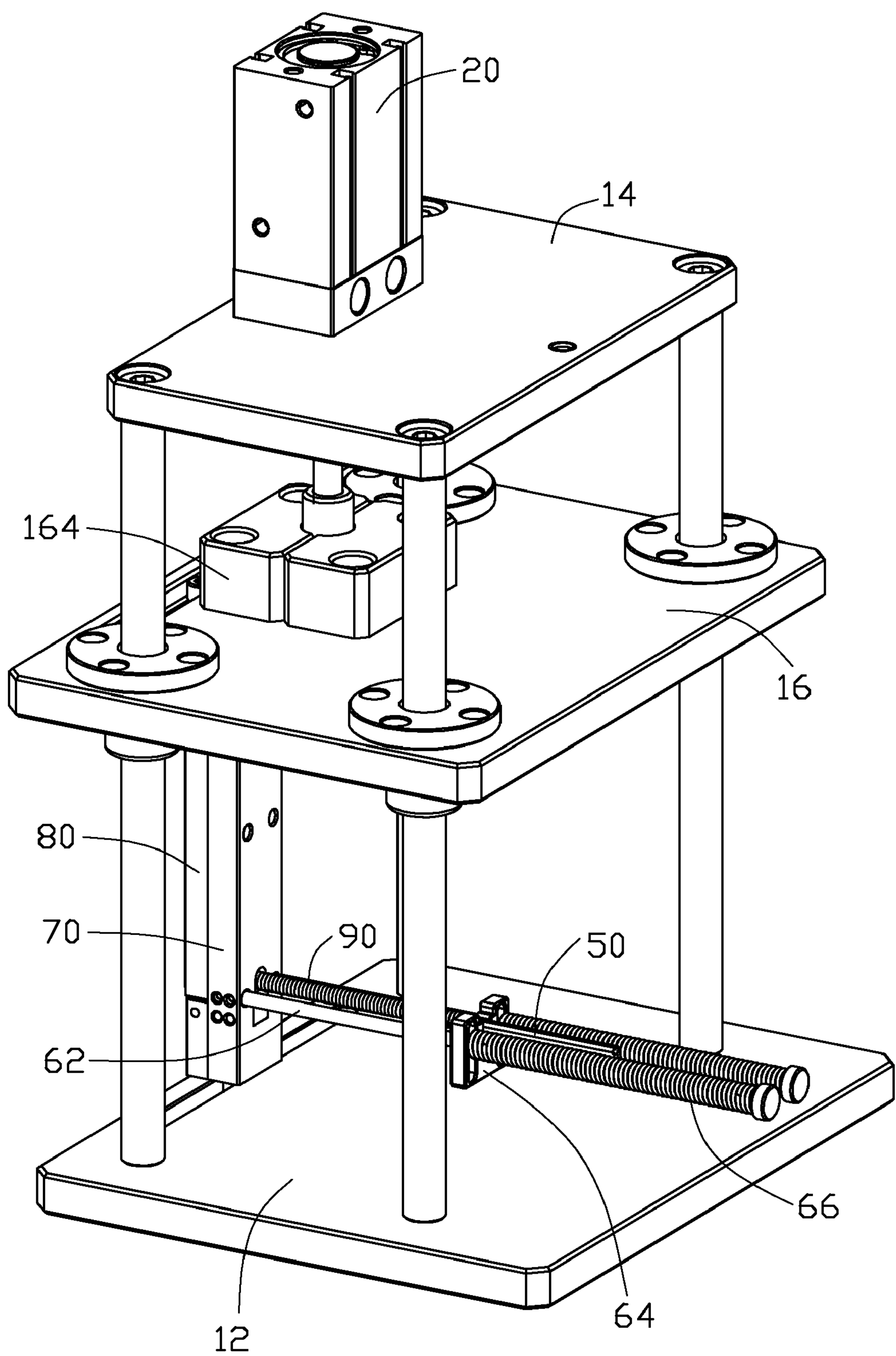
FIG. 4 is an assembled, isometric view of the mounting apparatus and the clamping ring of FIG. 3.
Figure 5:
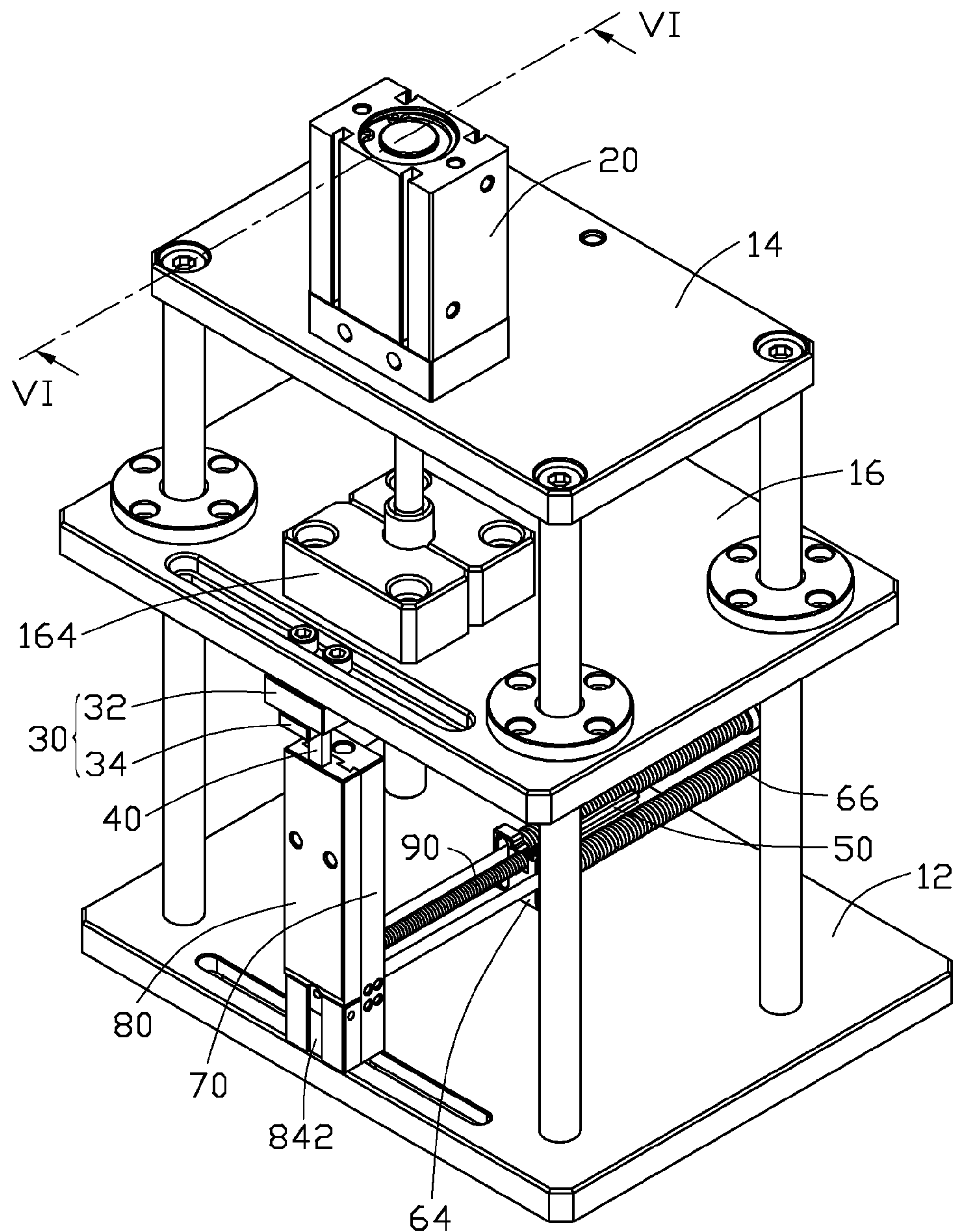
FIG. 5 is an assembled, isometric view of the mounting apparatus and the clamping ring of FIG. 1.

Referring to FIGS. 4 and 5, in assembly, the resisting member 80 is fixed to the fixing member 70, with the first surface 82 of the resisting member 80 resisting against the second side surface 74 of the fixing member 70. Therefore, the fins 742 of the fixing member 70 are clamped in the corresponding clamping slots 820 of the resisting member 80. The fixing port 762 and the through port 764 of the positioning hole 76 of the fixing member 70 are aligned with the fixing hole 88 and the receiving space 89, respectively. The second end of the pushing member 40 is engaged in the fixing hole 322 of the fixing block 32 of the connecting member 30, with the clamping tenon 342 of the connecting member 30 clamped in the clamping slot 42 of the pushing member 40. The pushing portion 44 of the pushing member 40 is slidably received in the sliding groove 86 of the resisting member 80. The fixing portion 52 of the magazine member 50 is passed through the fixing port 762 of the fixing member 70, to engage in the fixing hole 88 of the resisting member 80. Correspondingly, the magazine portion 54 of the magazine member 50 with the plurality of clamping rings 90 are passed through the through port 764 of the fixing member 70, to be received in the receiving space 89, with the first end 542 of the magazine portion 54 facing the resisting side 83 of the resisting member 80. Furthermore, a distance between the resisting side 83 of the resisting member 80 and the end surface of the first end 542 of the magazine portion 54 is little greater than the thickness of one clamping ring 90. The guiding rods 62 of the sending member 60 are passed through the corresponding elastic elements 66 of the sending member 60, and the through holes 642 of the moving board 64 of the sending member 60 in that order, to be fixed to the corresponding fixing holes 78 of the fixing member 70. In this time, the magazine portion 54 is slidably accommodated in the cutout 644 of the moving board 64, and the moving board 64 resists against a clamping ring 90 adjacent to the second end 544 of the magazine portion 54. The elastic elements 66 are deformed to resist against the corresponding head portions 622 of the guiding rods 62 and the moving board 64. Therefore, a clamping ring 90 adjacent to the first end 542 of the magazine portion 54 is pushed to resist against the resisting side 83 of the resisting member 80. Two fasteners 100 are passed through the stepped groove 124 of the bottom board 12 of the bracket 10, to be fixed to the bottom of the fixing member 70, for fixing the fixing member 70 to the bracket 10. Another two fasteners 100 are passed through the fixing slot 162 of the sliding board 16 of the bracket 10, to be engaged in the screw holes 320 of the connecting member 30, for fixing the connecting member 30 to the bracket 10. The guide shaft 22 of the air cylinder 20 is passed through the through hole 142 of the top board 14 of the bracket 10, to be fixed to the fixing hole 166 of the sliding board 16 of the bracket 10. Two screws (not shown) are passed through the fixing holes 144 of the top board 14 of the bracket 10, to be fixed to the air cylinder 20 for fixing the air cylinder 20 to the bracket 10.

The fasteners 100 can be moved in the stepped groove 124 and the fixing slot 162 to adjust positions of the fixing member 70 and the connecting member 30, respectively.

Figure 6:
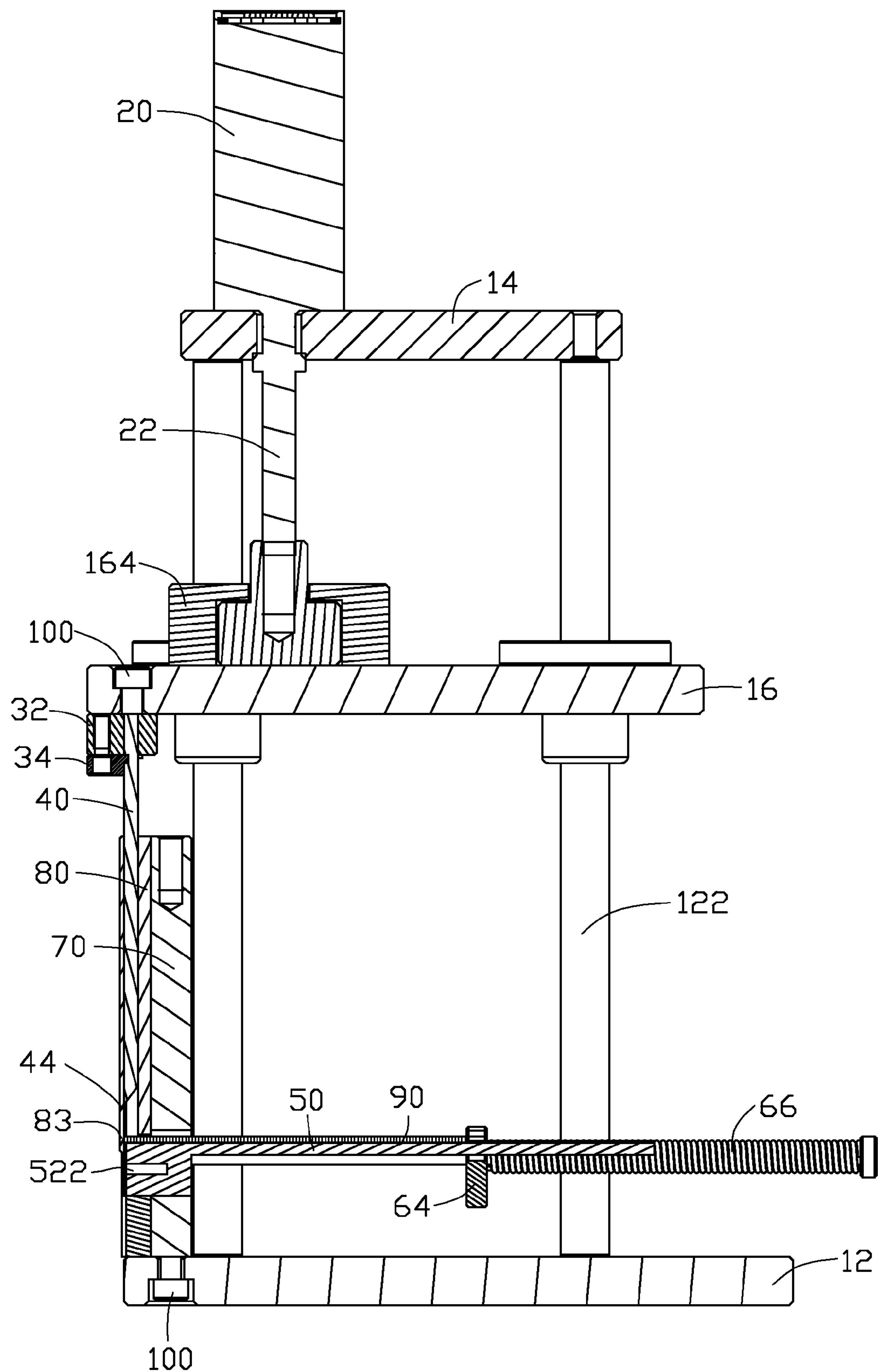
FIG. 6 is a sectional view of FIG. 4, taken along the line VI-VI.

Referring to FIG. 6, in use, the object with the connecting piece 96 is put against the second surface 84 of the resisting member 80, with the shaft 94 of the connecting piece 96 passed through the groove 842 of the resisting member 80, and inserted in the receiving hole 522 of the magazine member 50. The sliding board 16 of the bracket 10 is driven to move towards the bottom board 12 of the bracket 10 via the guiding shaft 22 of the air cylinder 20, the pushing member 40 being slid in the sliding groove 86 of the resisting member 80. Therefore, the clamping ring 90 adjacent to the first end 542 of the magazine member 50 is pushed to clamp the shaft 94 of the connecting piece 96.

The sliding board 16 of the bracket 10 is driven to move away from the bottom board 12 of the bracket 10 via the guide shaft 22 of the air cylinder 20, the pushing member 40 being slid in the sliding groove 86 of the resisting member 80. Therefore, elasticity of the elastic elements 66 of the sending member 60 urges the moving board 64 of the sending member 60, to push a next clamping ring 90 adjacent to the first end 542 of the magazine member 50 to resist against the resisting side 83 of the resisting member 80.

It is believed that the present embodiment and its advantages will be understood from the foregoing description, and it will be apparent that various changes may be made thereto without departing from the spirit and scope of the description or sacrificing all of its material advantages, the example hereinbefore described merely being exemplary embodiment.

What is claimed is:

1. An automatic mounting apparatus comprising:

a bracket comprising a sliding board;

a fixing member fixed to the bracket, the fixing member defining a positioning hole;

a resisting member fixed to the fixing member;

a pushing member fixed to the sliding board, and slidably received in the resisting member, the pushing member comprising a pushing surface;

a magazine member to have a plurality of clamping rings fitting about thereon, the magazine member fixed to the positioning hole, with the plurality of clamping rings passed through the positioning hole, one end of the magazine member facing the resisting member; and a sending member comprising two guiding rods fixed to the fixing member, two elastic elements fitting about the corresponding guiding rods, and a moving board slidably mounted to the guiding rods, the guiding rods each comprising a head portion, opposite ends of each of the elastic elements resisting against the corresponding head portion and the moving board, the elasticity of the elastic elements urging the moving board to drive one of the plurality of clamping rings to resist against the resisting member;

wherein when the sliding board is moved towards the fixing member, the pushing member is moved in the fixing member, with the pushing surface pushing one of the plurality of clamping rings to clamp a shaft of a connecting piece.

2. The apparatus of claim 1, wherein the fixing member defines two fixing holes located at opposite sides of the positioning hole, the guiding rods are fixed to the fixing holes, respectively, wherein the moving board defines two through holes for the corresponding guiding rods passing therethrough.

3. The apparatus of claim 1, wherein the positioning hole comprises a fixing port and a through port, the magazine member comprises a fixing portion fixed to the fixing port, and a magazine portion received in the through port.

4. The apparatus of claim 3, wherein the magazine portion having a Y-shaped cross-section extends from a side of the fixing portion, and juts out of the fixing portion, the moving board defines a Y-shaped cutout for slidably clamping the magazine portion.

5. The apparatus of claim 1, wherein the fixing member comprises a first side surface and a second side surface opposite to the first side surface, the resisting member is fixed to the second side surface.

6. The apparatus of claim 5, wherein two parallel fins extend from the second side surface, the resisting member defines two parallel clamping slots to engage with the fins, respectively.

7. The apparatus of claim 5, wherein the magazine member comprises a fixing portion and a magazine portion located on the fixing portion, the resisting member defines a fixing hole for fixedly receiving the fixing portion, and a receiving space for receiving the magazine portion.

8. The apparatus of claim 7, wherein the resisting member comprises a first surface resisting against the second side surface of the fixing member, and a second surface opposite to the first surface, the fixing hole is passed through the first and second surfaces, the receiving space is defined in the first surface and communicated with the fixing hole, the fixing hole and the receiving space are aligned with the positioning hole.

9. The apparatus of claim 8, wherein the resisting member defines a sliding groove parallel to the first surface and communicated with the receiving space, an inner side of the sliding groove forms a resisting side facing the receiving space, the distance between the resisting side and one end of the magazine member is slightly larger than a thickness of one of the plurality of clamping rings.

10. The apparatus of claim 9, wherein the pushing member slidably passes through the sliding groove.

11. The apparatus of claim 1, wherein a pushing portion extends from one end of the pushing member, the pushing surface is located at a distal end of the pushing portion, the thickness of the pushing surface is slightly smaller than the thickness of one of the plurality of clamping rings.

12. The apparatus of claim 1, further comprising a connecting member fixed to the sliding board, wherein the connecting member defines a fixing hole to fix the pushing member to the connecting member.

13. The apparatus of claim 12, wherein the pushing member defines a clamping slot, the connecting member comprises a clamping block, a clamping tenon extends from an end of the clamping block to engage in the clamping slot.

14. The apparatus of claim 1, wherein the bracket further comprise a top board, a bottom board, and a plurality of fixing rods perpendicularly connected between the top and bottom boards, the sliding board is slidably mounted to the plurality of fixing rods, and between the top and bottom boards.

15. The apparatus of claim 14, wherein the bottom board defines a stepped groove, two fasteners are movably passed through the stepped groove and fixed to the fixing member for adjustably fixing the fixing member to the bottom board.

16. The apparatus of claim 14, wherein an air cylinder is fixed to the top board and comprises a retractable guide shaft, the guiding shaft is fixed to the sliding board to drive the sliding board to move.

* * * * *